(12) United States Patent
Wang et al.

(10) Patent No.: US 10,301,935 B2
(45) Date of Patent: May 28, 2019

(54) MCI LOGGING FOR PROCESSING DOWNHOLE MEASUREMENTS

(71) Applicant: Halliburton Energy Services, Inc., Houston, TX (US)

(72) Inventors: Chao-Fu Wang, Singapore (SG); Ahmed E. Fouda, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/545,750

(22) PCT Filed: Oct. 18, 2016

(86) PCT No.: PCT/US2016/057450
§ 371 (c)(1),
(2) Date: Jul. 24, 2017

(87) PCT Pub. No.: WO2018/075007
PCT Pub. Date: Apr. 26, 2018

(65) Prior Publication Data

US 2018/0347353 A1 Dec. 6, 2018

(51) Int. Cl.
*E21B 49/00* (2006.01)
*E21B 47/12* (2012.01)
(Continued)

(52) U.S. Cl.
CPC .............. *E21B 49/003* (2013.01); *E21B 7/04* (2013.01); *E21B 47/12* (2013.01); *G01V 1/50* (2013.01);
(Continued)

(58) Field of Classification Search
CPC ......... E21B 49/003; E21B 47/12; G01V 1/50; G01V 3/28; G01V 3/38; G01V 11/00; G01V 2200/16; G01V 2210/6169
See application file for complete search history.

(56) References Cited

U.S. PATENT DOCUMENTS 6,466,872 B1 10/2002 Kriegshauser et al.
7,236,886 B2 6/2007 Frenkel
(Continued)

FOREIGN PATENT DOCUMENTS

EP 1003053 A2 5/2000
GB 2511143 A 8/2014
(Continued)

OTHER PUBLICATIONS

Hou, Junsheng, et al. "Real-time borehole correction for a new multicomponent array induction logging tool in OBM wells." SPWLA 53rd Annual Logging Symposium. Society of Petrophysicists and Well-Log Analysts, 2012.
(Continued)

*Primary Examiner* — Manuel L Barbee
(74) *Attorney, Agent, or Firm* — Benjamin Fite; Baker Botts L.L.P.

(57) ABSTRACT

Hybrid inversion processing techniques are implemented that result in improved speed and accuracy of determining formation properties using log data, for example, from an multi-component induction logging tool. Logging data relating to the formation of interest is obtained and used as an input. High frequency noise is then removed from the logging data and bed-boundary determination is performed using the logging data. An adaptive low pass filter is applied to the logging data and the logging data is inverted. The inverted logging data is correct and enhanced by determining one or more weights based on one or more quality indicators. The inverted logging data may then be visually
(Continued)

interpreted and used to adjust one or more drilling parameters.

30 Claims, 8 Drawing Sheets

(51) Int. Cl.
    *G01V 1/50*     (2006.01)
    *G01V 3/18*     (2006.01)
    *G01V 3/28*     (2006.01)
    *G01V 3/38*     (2006.01)
    *G01V 11/00*     (2006.01)
    *E21B 7/04*     (2006.01)

(52) U.S. Cl.
    CPC ............... *G01V 3/18* (2013.01); *G01V 3/28* (2013.01); *G01V 3/38* (2013.01); *G01V 11/00* (2013.01); *G01V 2200/16* (2013.01); *G01V 2210/6169* (2013.01)

(56) References Cited

U.S. PATENT DOCUMENTS

| | | | |
|---|---|---|---|
| 7,756,641 | B2 | 7/2010 | Donadille et al. |
| 7,894,990 | B2 | 2/2011 | Wang et al. |
| 8,433,518 | B2 | 4/2013 | Omeragic et al. |
| 2005/0256642 | A1 | 11/2005 | Barber et al. |
| 2008/0175099 | A1* | 7/2008 | Hawthorn ............ G01V 1/50 367/25 |
| 2013/0105224 | A1* | 5/2013 | Donderici ............ G01V 3/30 175/45 |
| 2014/0257703 | A1 | 9/2014 | Wu et al. |
| 2014/0324353 | A1 | 10/2014 | Hou et al. |
| 2016/0003964 | A1 | 1/2016 | Celepcikay et al. |
| 2016/0047239 | A1* | 2/2016 | Hou .................... E21B 47/12 702/7 |
| 2016/0131791 | A1 | 5/2016 | Wu et al. |

FOREIGN PATENT DOCUMENTS

| | | | |
|---|---|---|---|
| WO | WO-0039612 A1 * | 7/2000 | ........... G01V 3/28 |
| WO | 2011/123379 A1 | 10/2011 | |
| WO | 2014/042621 A1 | 3/2014 | |
| WO | 2016/133517 A1 | 8/2016 | |

OTHER PUBLICATIONS

International Search Report and Written Opinion issued in related PCT Application No. PCT/US2016/057450 dated Jul. 10, 2017, 10 pages.

* cited by examiner

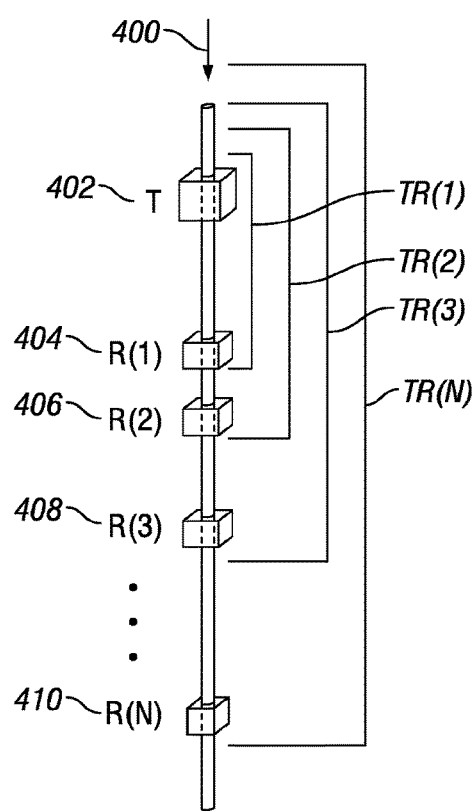
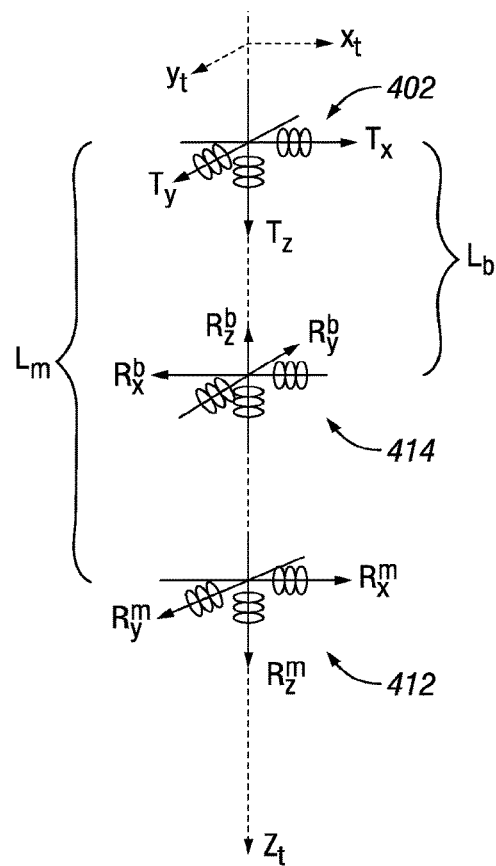
FIG. 4A
FIG. 4B

MCI LOGGING FOR PROCESSING DOWNHOLE MEASUREMENTS

CROSS-REFERENCE TO RELATED APPLICATION

The present application is a U.S. National Stage Application of International Application No. PCT/US2016/057450 filed Oct. 18, 2016, which is incorporated herein by reference in its entirety for all purposes.

BACKGROUND

The present application is directed to improving performance of subterranean operations and more specifically, to improving accuracy and stability of determining formation properties using log or measurement data.

Hydrocarbons, such as oil and gas, are commonly obtained from subterranean formations. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Modern oil field operations demand a great quantity of information relating to the parameters and conditions encountered downhole. Such information may include characteristics of the earth formation traversed by the wellbore and data relating to the size and configuration of the wellbore itself. The collection of information relating to conditions downhole, which is commonly referred to as "logging," can be performed by several methods, including wireline logging, logging-while-drilling ("LWD"), drillpipe conveyed logging, and coil tubing conveyed logging. A variety of logging tools are available for use with each of these methods. These logging tools may be used to perform wellbore imaging. Wellbore imaging is an important aspect of drilling and geosteering when performing subterranean operations.

Multi-component induction ("MCI") logging is one of the logging methods used to analyze subterranean formations. An objective of MCI logging is fast and accurate delivery of resistivity anisotropy (horizontal and vertical resistivities), dip, strike of formation, and conventional ("ZZ") induction logs. MCI logging methods may be susceptible to errors because the inversion algorithm used is based on a radial one-dimensional ("R1D") forward model and only on MCI data. In some instances, for example, where there are strong shoulder-bed and horn effects included in the MCI measurements or in instances when the MCI data is obtained in complex borehole environments (for example, an oval hole), the accuracy of the inverted results can be significantly degraded.

BRIEF DESCRIPTION OF THE DRAWING(S)

The present disclosure will be more fully understood by reference to the following detailed description of the preferred embodiments of the present disclosure when read in conjunction with the accompanying drawings, in which like reference numbers refer to like parts throughout the views, wherein:

FIG. 4A shows an illustrative multi-component induction (MCI) logging tool in accordance with one or more embodiments of the present disclosure.

FIG. 4B shows an illustrative triaxial subarray of the MCI logging tool of FIG. 4A.

Figure 7A:
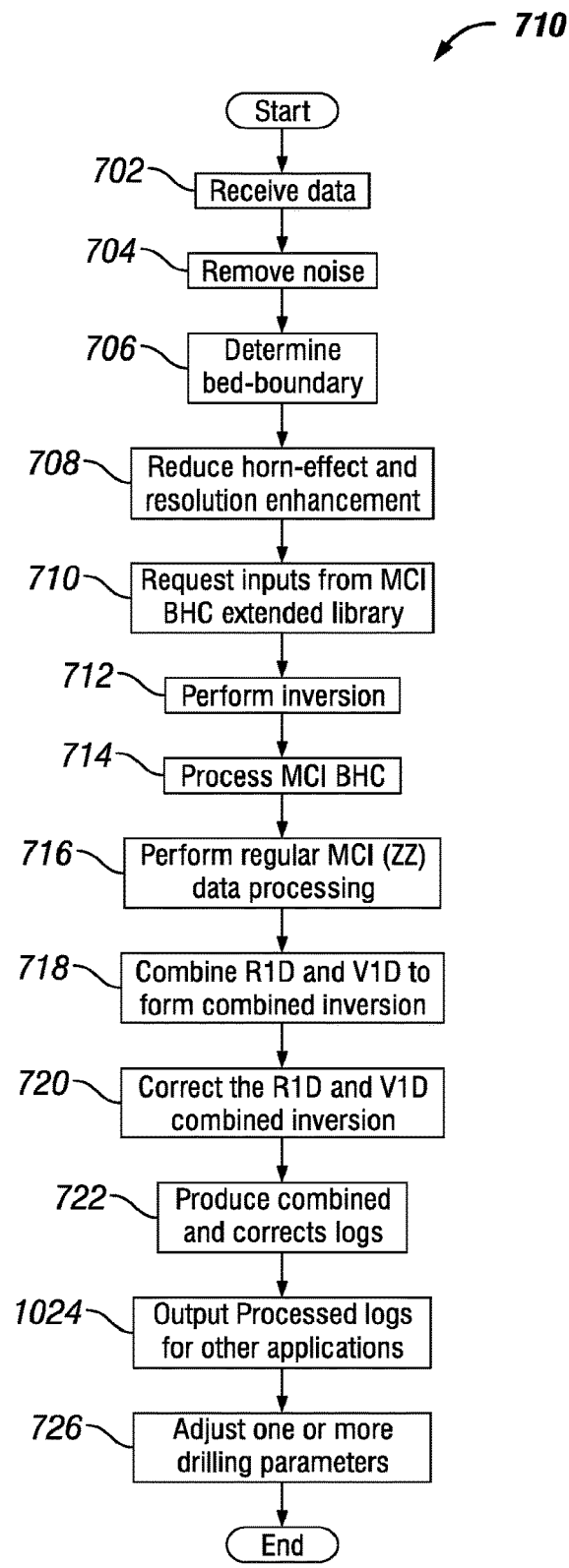

FIG. 7A generally depicts different aspects of a method in accordance with one or more embodiments of the present disclosure.

Figure 7B:
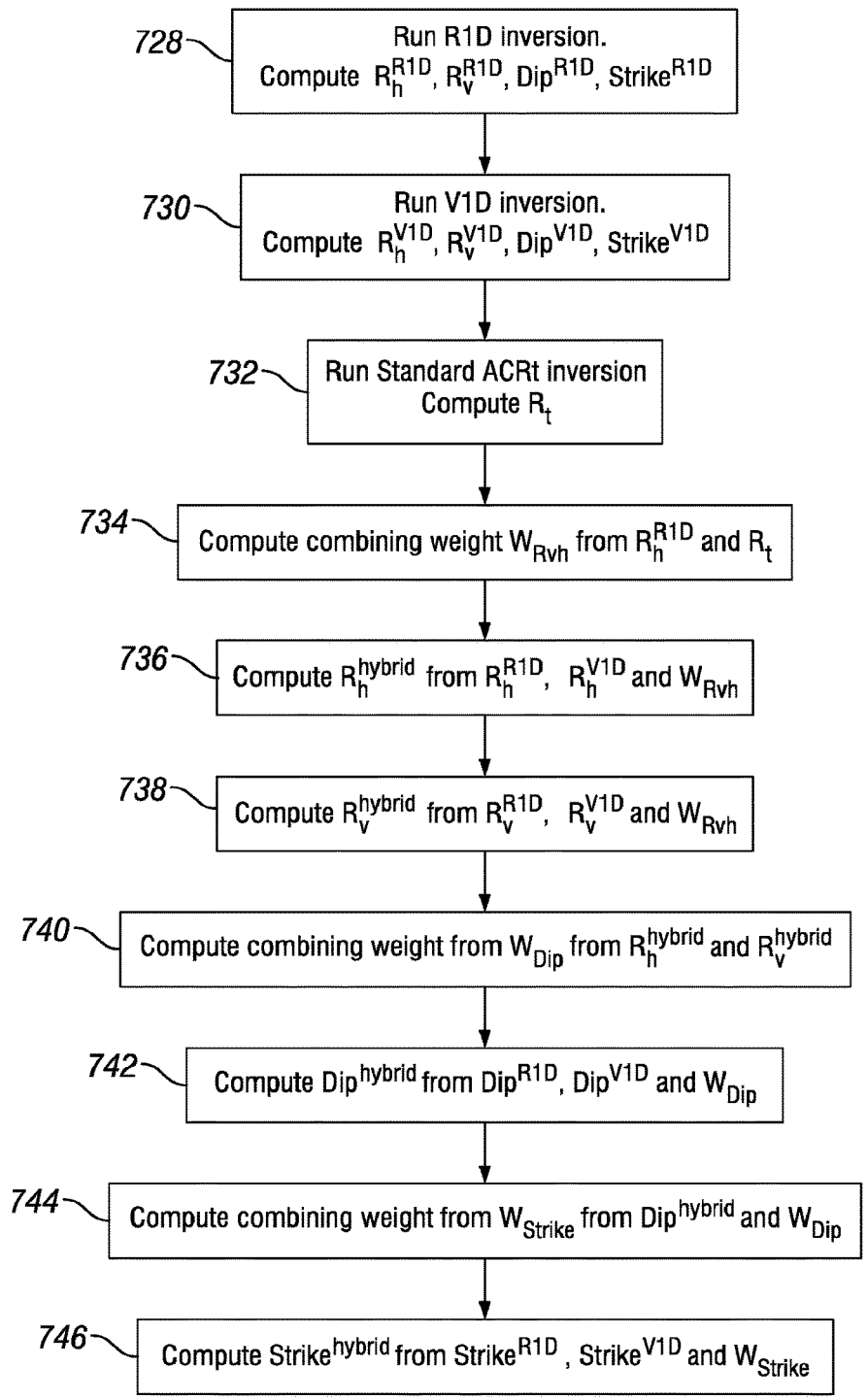

FIG. 7B generally depicts different aspects of a method for a hybrid R1D-V1D processing of measured log data in accordance with one or more embodiments of the present disclosure.

Figure 8:
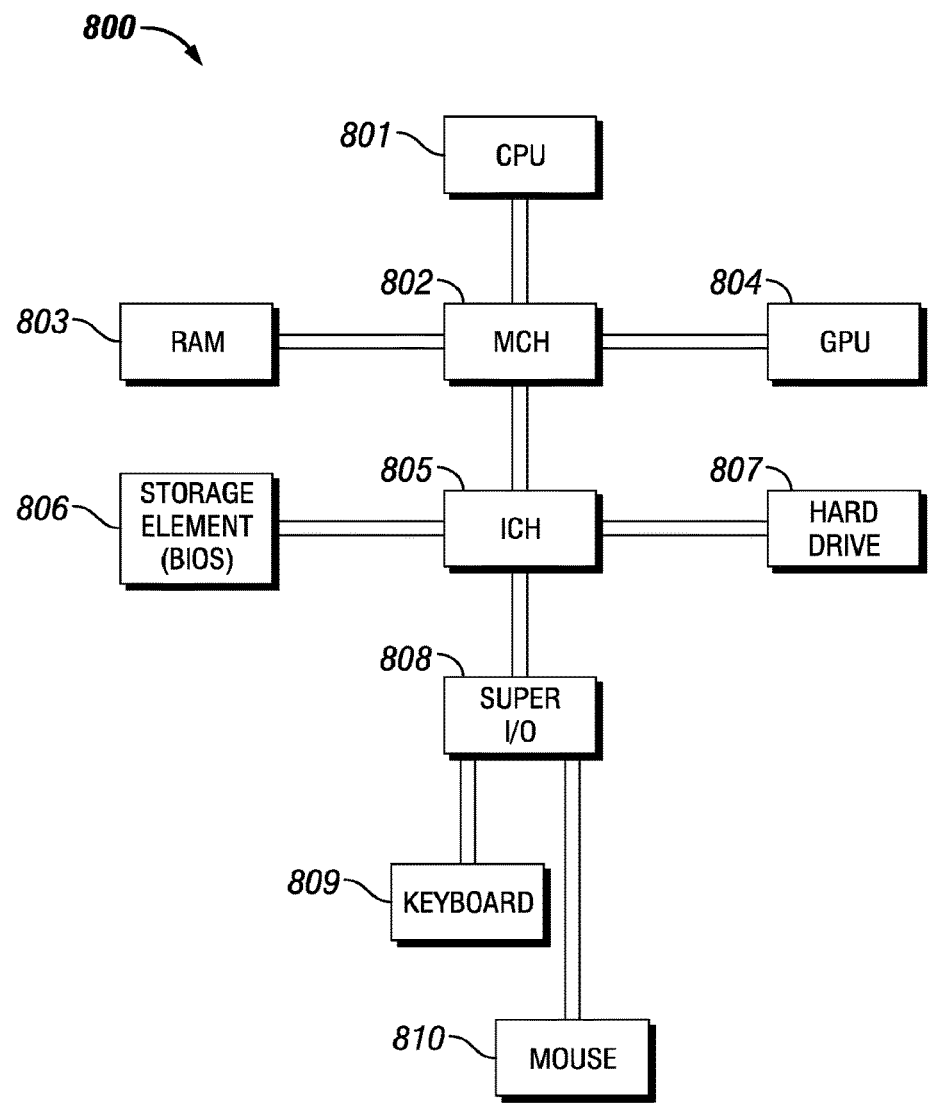

FIG. 8 shows an illustrative information handling system in accordance with one or more embodiments of the present disclosure.

Figure 9:
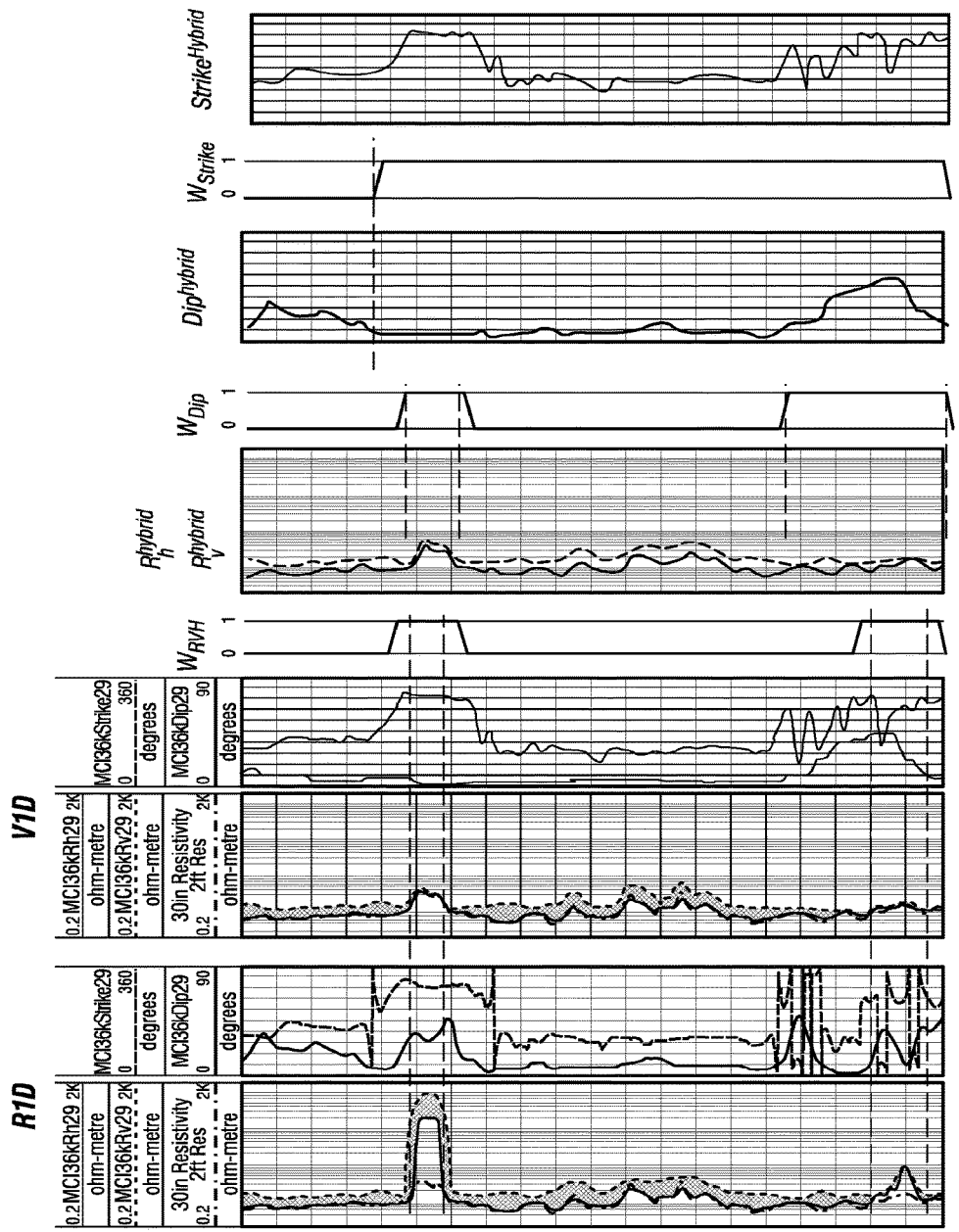

FIG. 9 shows an illustration of an example for hybrid R1D-V1D processing of measured log data in accordance with one or more embodiments of the present disclosure.

The disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description, and all changes which come within the meaning and range of equivalency of the claims are therefore intended to be embraced therein.

DETAILED DESCRIPTION OF THE DISCLOSURE

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

The term "uphole" as used herein means along the drillstring or the wellbore hole from the distal end towards the surface, and "downhole" as used herein means along the drillstring or the wellbore hole from the surface towards the distal end. The term "strike" as used herein refers to the direction of a line formed by the intersection of the surface of an inclined bed with a horizontal plane. The term "dip" as used herein refers to the angle of slope of an inclined bed measured perpendicular to the strike and in the vertical plane, referenced to the horizontal plane.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is suitable for testing, retrieval and sampling along sections of the formation.

Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline, MWD or LWD operations.

The present application is directed to improving performance of subterranean operations and more specifically, to a method and system for improving accuracy and stability of determining formation properties using logging data. One or more embodiments provide a multi-step borehole correction (BHC) scheme for MCI tools for improved transmitter-receiver coupling measurements and inversion process to obtain accurate and stable logs. These logs may be utilized to determine more precise formation parameters to better adjust drilling parameters for a given operation. One or more embodiments utilize a hybrid enhancement of inversion for accurate processing of formation log data with high resistivity and anisotropy ratio using MCI logging tools for various operations including, but not limited to, oil-based mud ("OBM") operations.

Induction logging provides a great quantity of necessary information demanded by oil field operations. As compared to conventional induction logging, MCI logging has extended capability of providing additional crucial formation information or parameters, such as anisotropic resistivity and dip/azimuth of the formation. Some systems utilize an adaptive low-pass filtering technique to remove horn effects in certain components based on log-data uncertainty and bed-boundary information, thereby reducing the overall impact of horn effects. The term "horn effects" as used herein refers to the effect on an MCI log of charge buildup at the boundary between two formation beds with different conductive properties. Specifically, the current loops generated by the tool in the formation cross the bed boundaries and generate a charge buildup at the boundaries between the formation beds. The result is a short interval of deviation to high resistivity compared to true tool readings around the formation bed boundaries. This effect depends on the resistivity contrast between the formation beds and relative dip between the hole and the formation bed. The magnitude of the deviations varies with different MCI components (for example, ZZ, XX, YY, and ZX) and their spacing.

The term "log-data uncertainty" as used herein refers to the measurement error/precision. The term "bed-boundary information" as used herein refers to the boundary position along the borehole axis. Due to higher vertical resolution and lower horn effects of some combined MCI logs, different combined MCI logs are used for the R1D inversion. Further, Software Focusing ("SWF") processing may be used for further enhancing the vertical resolution of the MCI data. In certain embodiments, the accuracy of the inverted results may be improved by using multiple log information (for example, multi-arm caliper, directional measurements, and image/dipmeter) to form finalized results of horizontal and vertical resistivities and dip angle by combining R1D and vertical one-dimensional ("V1D") inversion results. It is well known that the conventional ZZ induction processing is usually based on a borehole-correction (BHC) model of a vertical borehole surrounded by a full-space isotropic formation. However, a hybrid enhancement of R1D and V1D inversion may provide more accurate processing of log data for a formation with high resistivity and anisotropy ratio using MCI logging tools.

Figure 1:
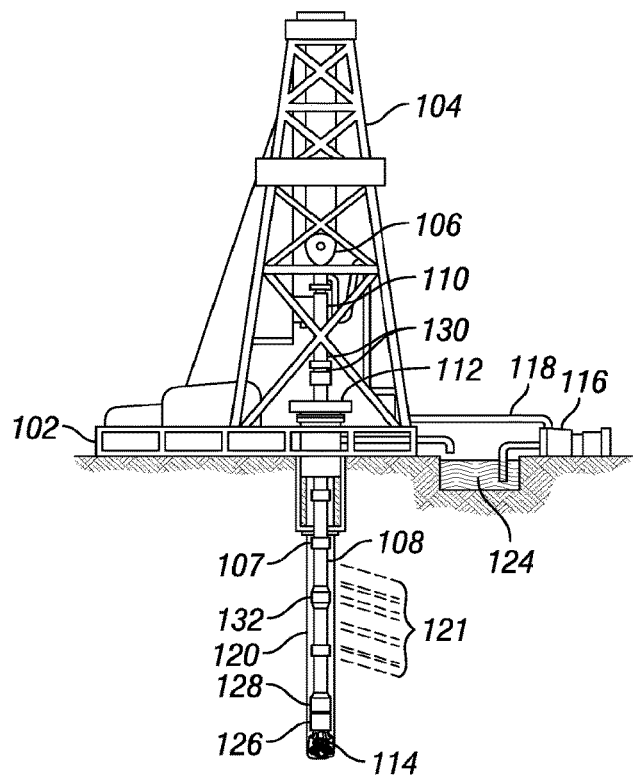
FIG. 1 shows an illustrative logging while drilling environment according to one or more embodiments of the present disclosure.

The disclosed tool, systems and methods are best understood in the context of the larger systems in which they operate. Accordingly, FIG. 1 shows an illustrative multi-component induction logging environment. A drilling platform 102 is equipped with a derrick 104 that supports a hoist 106 for raising and lowering a drill string 108. The hoist 106 suspends a top drive 110 that rotates the drill string 108 as the drill string is lowered through the well head 112. Sections of the drill string 108 are connected by threaded connectors 107. Connected to the lower end of the drill string 108 is a drill bit 114. As bit 114 rotates, it creates a borehole 120 that passes through various formations 121. A pump 116 circulates drilling fluid through a supply pipe 118 to top drive 110, through the interior of drill string 108, through orifices in drill bit 114, back to the surface via the annulus around drill string 108, and into a retention pit 124. The drilling fluid transports cuttings from the borehole into the pit 124 and aids in maintaining the integrity of the borehole 120.

In wells employing acoustic telemetry for logging while drilling (LWD), downhole sensors (including resistivity logging tool 126) are coupled to a telemetry module 128 having an acoustic telemetry transmitter that transmits telemetry signals in the form of acoustic vibrations in the tubing wall of drill string 108. An acoustic telemetry receiver array 130 may be coupled to tubing below the top drive 110 to receive transmitted telemetry signals. One or more repeater modules 132 may be optionally provided along the drill string 108 to receive and retransmit the telemetry signals. Of course other telemetry techniques may be employed including mud pulse telemetry, electromagnetic telemetry, and wired drill pipe telemetry. Many telemetry techniques also offer the ability to transfer commands from the surface to the tool, thereby enabling adjustment of the tool's configuration and operating parameters. In some embodiments, the telemetry module 128 also or alternatively stores measurements for later retrieval when the tool returns to the surface.

A resistivity logging tool 126 is integrated into the bottom hole assembly near the bit 114. The resistivity logging tool 126 may take the form of a drill collar, for example, a thick-walled tubular that provides weight and rigidity to aid the drilling process. The resistivity logging tool 126 may comprise a multi-component induction (MCI) tool according to one or more embodiments of the present disclosure. As the drill bit 114 extends the borehole 120 through the formations 121, resistivity logging tool 126 may collect MCI measurements as well as measurements of the resistivity logging tool 126 orientation and position, borehole size, drilling fluid resistivity, and various other drilling conditions.

The orientation measurements may be performed using an orientation indicator, which may include magnetometers, inclinometers, and/or accelerometers, though other sensor types such as gyroscopes may be used. Preferably, the resistivity logging tool 126 includes a 3-axis fluxgate magnetometer and a 3-axis accelerometer. As is known in the art, the combination of those two sensor systems enables the measurement of the rotational ("toolface") angle, borehole inclination angle (aka "slope"), and compass direction ("azimuth"). In some embodiments, the toolface and borehole inclination angles are calculated from the accelerometer sensor output. The magnetometer sensor outputs are used to calculate the borehole azimuth. With the toolface, the borehole inclination, and the borehole azimuth information, various resistivity logging tools disclosed herein can be used to steer the bit to the desirable bed.

Figure 2:
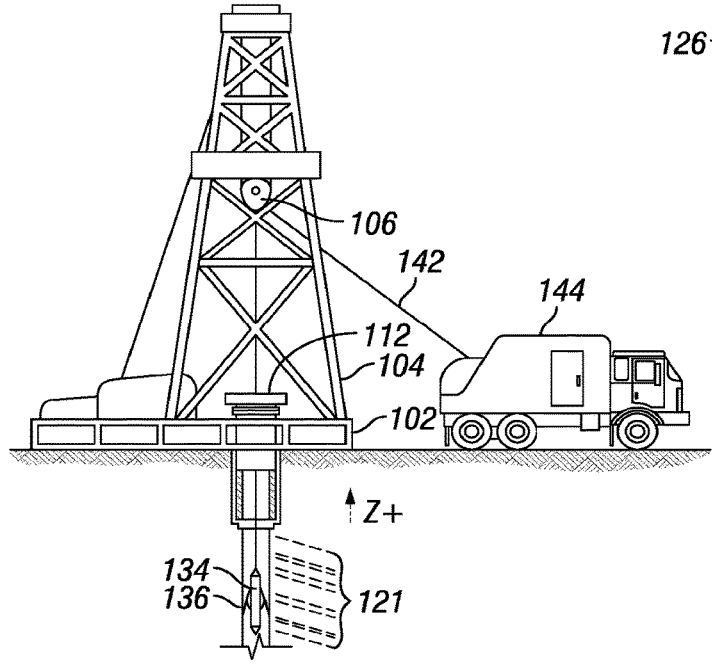
FIG. 2 shows an illustrative wireline logging environment according to one or more embodiments of the present disclosure.

At various times during the drilling process, the drill string 108 is removed from the borehole as shown in FIG. 2. Once the drill string has been removed, logging operations can be conducted using a wireline logging tool 134, a sensing instrument sonde suspended by a cable 142 having conductors for transporting power to the wireline logging tool 134 and telemetry from the wireline logging tool 134 to the surface. A resistivity logging portion of the wireline logging tool 134 may have centralizing arms 136 that center the wireline logging tool 134 within the borehole as the wireline logging tool 134 is pulled uphole. The wireline logging tool 134 may comprise an MCI tool according to one or more embodiments of the present disclosure. A logging facility 144 collects measurements from the wireline logging tool 134, and includes computing facilities for processing and storing the measurements gathered by the wireline logging tool 134.

Figure 3:
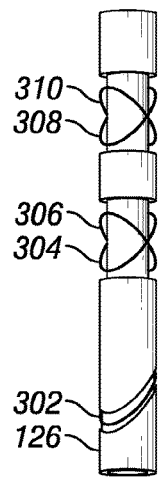
FIG. 3 shows an illustrative antenna configuration for a multi-component induction logging tool according to one or more embodiments of the present disclosure.

FIG. 3 shows an illustrative resistivity logging tool 126 having antennas for acquiring MCI logging measurements. For example, resistivity logging tool 126 can have one or more tilted transmit antennas (one is shown as 302) and one or more pairs of tilted receive antennas (two pairs 304, 306 and 308, 310 are shown), thereby providing two or more transmit-receive antenna pairings. For example, as depicted four transmit-receive antenna pairings are shown. The resistivity logging tool 126 acquires attenuation and phase measurements of each receive antenna's response to transmit antenna 302. In certain alternative embodiments, the resistivity logging tool 126 measures in-phase and quadrature-phase components of the receive signals rather than measuring amplitude and phase. In either case, these measurements are collected and stored as a function of the resistivity logging tool's 126 position and rotational orientation in the borehole 120.

The illustrated resistivity logging tool 126 comprises one or more coil antennas, for example, receive antennas 304 and 308 oriented parallel to the transmit antenna 302, and receive antennas 306 and 310 oriented perpendicular to the transmit antenna 302. In the illustrated example, each of the coil antennas share a common rotational orientation, with antennas 302, 304, 308 being tilted at −45° and antennas 306, 310 being tilted at +45° relative to the longitudinal tool axis. In the illustrative tool embodiments, each of the coil antennas surrounding the resistivity logging tool 126 is mounted in a recess and protected by a non-conductive filler material and/or a shield having non-conducting apertures. The resistivity logging tool body may be primarily composed of steel or any other suitable material. The relative resistivity logging tool 126 dimensions and coil antenna spacings are subject to variation and may depend on several factors, including, but not limited to, on the desired tool properties. The distance between the receive coil antenna pairs may be on the order of 0.01 to 0.25 meters (m), while the spacing of the transmit coil to the midpoint between the receiver pairs may vary from about 0.4 m to over 10 m. Specific dimensions are illustrative and any dimension or variation of distance between components may be implements according to the specifications of a given operation.

FIG. 4A depicts an exemplary MCI logging tool ("MCI tool") that may be used in accordance with an embodiment of the present disclosure denoted generally with reference numeral 400. In general, the MCI tool 400 operates at multiple frequencies and has several triaxial transmitter-receiver subarrays or triads. In certain embodiments, the MCI tool 400 may include a transmitter 402 (T) and a number of receivers (for example, receivers 404 (R(1)), 406 (R(2)), 408 (R(2)), 410 (R(N))) positioned at different axial positions along the MCI tool 400. As shown in more detail in FIG. 4B and discussed below, each receiver 404, 406, 408, and 410 may include a separate main triad 412 and bucking triad 414. The transmitter 402 and receivers 404, 406, 408, and 410 of the MCI tool (400) form N triaxial subarrays (denoted as TR(1), TR(2), TR(3) and TR(N)).

FIG. 4B depicts a triaxial subarray TR(1) of the MCI tool 400 formed by the transmitter 402 (T) and the receiver 404 (R(1)). Specifically, the transmitter 402 may include three mutually orthogonal co-located transmitters (Tx, Ty, Tz). The receiver 404 of the triaxial subarray TR(1) may further include a main triaxial receiver 412 and a bucking triaxial receiver 414. The main triaxial receiver 412 and the bucking triaxial receiver 114 may each include a set of three mutually orthogonal co-located receivers ($R_x^m, R_y^m, R_z^m$) and ($R_x^b, R_y^b, R_z^b$), respectively. These triaxial transmitters and receivers are collocated to ensure each triad may measure nine-component voltages at each operating frequency and each measured depth (MD) in the 3D coordinate system of the MCI tool 400 as discussed below.

As shown in FIG. 4B, $L_m$ and $L_b$ denote the transmitter-receiver spacing of the main triaxial receiver 412 and the bucking triaxial receiver 414, respectively. Further, the tool/measurement coordinates are denoted as ($x_t$, $y_t$, $z_t$) in FIG. 4B. Accordingly, each triaxial subarray (TR(1) through TR(N)) may measure and generate a nine-coupling voltage measurement in the tool/measurement coordinate system ($x_t$, $y_t$, $z_t$) at every log depth. The voltages measured on the receivers 404, 406, 408, and 410 may be converted into apparent conductivities and expressed as a 3-by-3 tensor or matrix for a triad operated at a given frequency:

$$\overline{\overline{\sigma_a^{(i)}}} = \begin{bmatrix} \sigma_{xx}^{(i)} & \sigma_{xy}^{(i)} & \sigma_{xz}^{(i)} \\ \sigma_{yx}^{(i)} & \sigma_{yy}^{(i)} & \sigma_{yz}^{(i)} \\ \sigma_{zx}^{(i)} & \sigma_{zy}^{(i)} & \sigma_{zz}^{(i)} \end{bmatrix} = (\sigma_{IJ}^{(i)}) \text{ where}$$
[Equation 1]

$I, J = x, y, z$ and $i = 1, 2, \ldots, N$ where $\overline{\overline{\sigma_a^{(i)}}}$ is referred to as the MCI apparent conductivity tensor (R-signal or X-signal) in the tool coordinate system, $\sigma_{IJ}^{(i)}$ is the measured conductivity coupling with the first subscript (I) indicating the transmitter direction and the second subscript (J) indicating the receiver direction. Accordingly, when I, J=x, $\sigma_{IJ}^{(i)}$ is $\sigma_{xx}^{(i)}$ or (XX); when I, J=y, $\sigma_{IJ}^{(i)}$ is $\sigma_{yy}^{(i)}$ or (YY); and when I, J=z, $\sigma_{IJ}^{(i)}$ is $\sigma_{zz}^{(i)}$ (or ZZ). These are the traditional (ZZ) multiarray induction measurements. Further, N is the total number of triaxial subarrays of the MCI tool 400.

Figure 5:
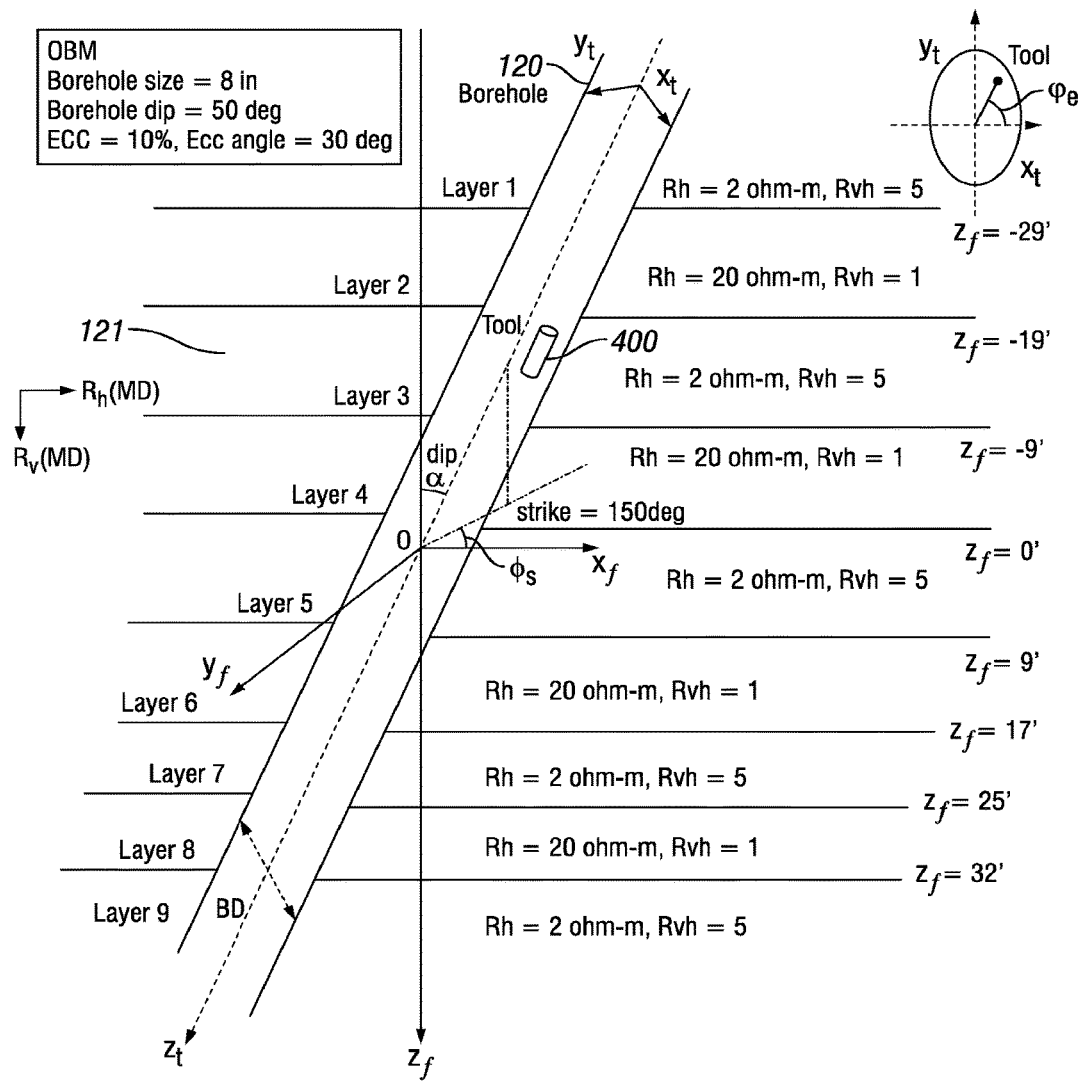
FIG. 5 shows an illustrative MCI logging tool coordinate system and formation coordinate system with an MCI measurement logging tool going through a borehole in a formation in accordance with one or more embodiments of the present disclosure.

FIG. 5 shows a generic MCI measurement tool coordinate system and formation coordinate system with an MCI tool 400 going through a borehole 120 in a formation 121. The formation 121 is shown as having a plurality of layers (Layer 1 through Layer 9) which the borehole 120 traverses. The formation coordinates are denoted as ($x_f$, $y_f$, $z_f$) and the tool/measurement coordinates are denoted as ($x_t$, $y_t$, $z_t$) where $R_h$, $R_v$, BD, $R_m$, $\varphi_e$, $\alpha$ and $\phi_s$ denote formation horizontal resistivity, formation vertical resistivity, borehole diameter, mud resistivity, tool eccentricity azimuthal angle, relative dip angle, and formation azimuth/strike angle, respectively. Further, $R_{vh}=R_v/R_h$ denotes the anisotropy ratio of the formation 121. With the measured apparent conductivity tensor $\sigma$ of the formation 121, theoretically, the formation properties, such as $R_h$, $R_v$ (or $R_{v,h}$), dip angle $\alpha$, strike $\phi_s$ as well as other formation properties may be recovered through a proper inversion processing system in the OBM. The conversion of the measured apparent conductivities into the formation properties may prove difficult due to the very high computational complexity caused by the nonlinear behavior of multiple variables as a function of the large amount of measurement data.

Figure 6B:
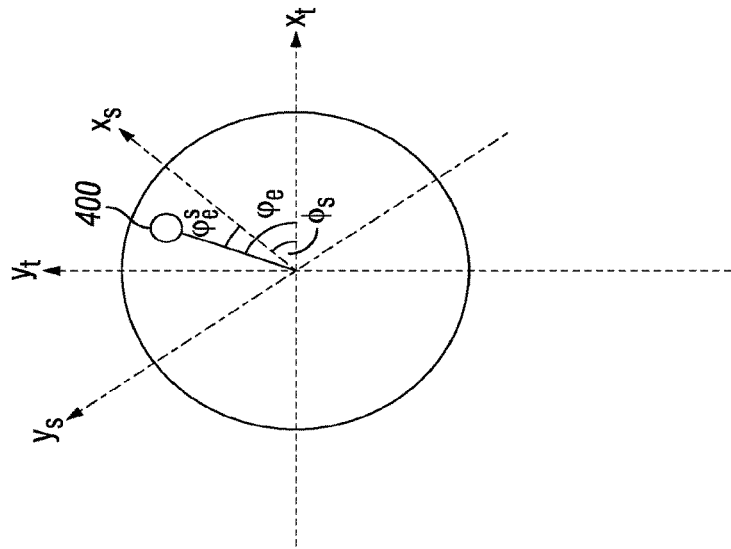
FIG. 6B shows an illustrative two dimensional view of a forward model for both R1D and V1D inversions in accordance with one or more embodiments of the present disclosure.
Figure 6A:
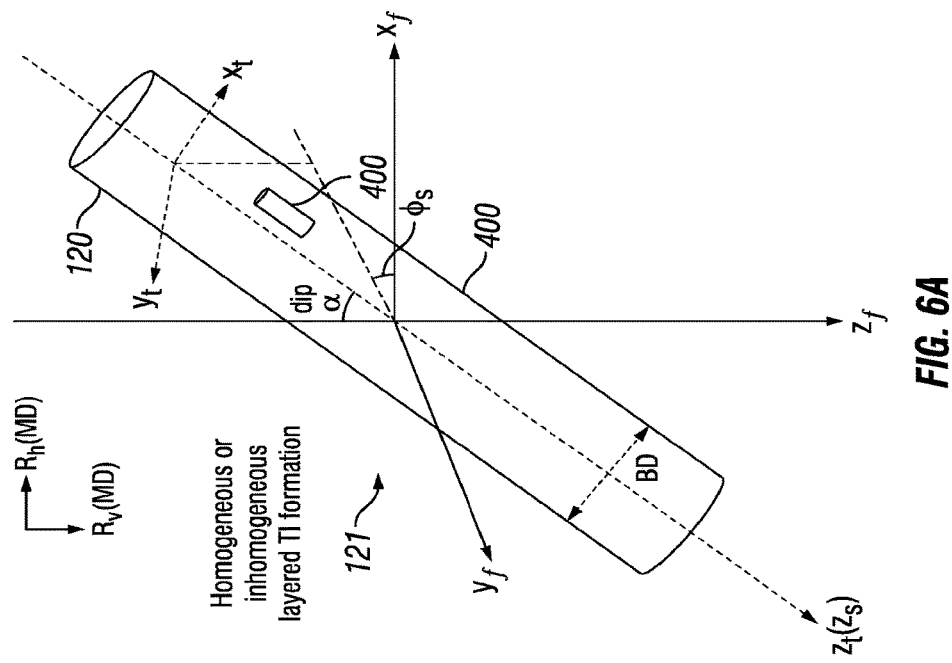
FIG. 6A shows an illustrative three dimensional view of a forward model for R1D and V1D inversions in accordance with one or more embodiments of the present disclosure.

FIG. 6A and FIG. 6B depict three dimensional (3D) and two dimensional (2D) views of a forward model for both R1D and V1D inversions, respectively. Specifically, FIG. 6A shows a 3D view and FIG. 6B shows a 2D view in the $x_t$-$y_t$ plane. A forward model consisting of a borehole 120 with a circular cross-section surrounded by an infinitely thick homogenous formation 121 may be used for the radial 1D (R1D) inversion. The borehole 120 with a diameter of BD may be vertical or deviated and the MCI tool 400 may be centralized or decentralized in the borehole 120. The formation resistivity may be isotropic or transversely isotropic (TI). The tool coordinate system is denoted as ($x_t$, $y_t$, $z_t$) and the formation coordinate system is denoted as ($x_f$, $y_f$, $z_f$). Additionally, ($x_s$, $y_s$, $z_s$) is provided as an intermediate coordinate system which is referred to as the strike coordinate system. For a vertical 1D (V1D) inversion, the forward model may be a layered inhomogeneous TI formation without a borehole.

According to numerical solutions, for a given subarray operated at a particular frequency, the MCI apparent conductivity tensor acquired in an OBM may depend on operational or formation parameters: formation horizontal resistivity ($R_h$); formation vertical resistivity ($R_v$, or anisotropic ratio $R_{vh}=R_v/R_h$); borehole diameter (BD); tool eccentric distance from the borehole center (or standoff) or eccentricity (ecc) ($d_{ecc}$, or ecc=$2d_{ecc}$/BD); tool eccentricity azimuthal angle ($\varphi_e$, or $\varphi_e^s$); borehole/anisotropic dip angle (dip) $\alpha$; and borehole/anisotropic dipping azimuthal angle or formation strike ($\phi_s$). Accordingly, this borehole-formation model is an R1D model with both dip and anisotropy parameters.

The forward model for the V1D inversion may be a vertical layered inhomogeneous TI formation without a borehole. Accordingly, this model may include the shoulder-bed effect but the dip angle may be assumed a constant in a selected computational window for the inversion processing. As would be appreciated by those of ordinary skill in the art, with the benefit of this disclosure, ignoring the shoulder effect for R1D inversion and/or assuming a constant dip angle in a selected window for a V1D inversion may produce significant errors. Therefore, the R1D and V1D inverted parameters may be combined to form the desired delivery products for real data processing in some conditions. Two basic 3D rectangular coordinate systems may come into play for describing the forward model: tool/measurement coordinate system ($x_t$, $y_t$, $z_t$) and formation coordinate system ($x_f$, $y_f$, $z_f$), which are connected by coordinate rotations described by rotation matrices. Further, if an invasion occurs, some borehole mud fluid may invade into the formation 121 around the borehole 120, which changes the resistivity distribution in the formation 121. In this case, the resistivity distribution is often three dimensional. Accordingly, a 3D inversion must then be used for refining the R1D and/or V1D inverted results.

Consequently, the present disclosure provides a new log data processing system for obtaining a determination (including a real-time determination) of formation of horizontal resistivities, vertical resistivities, dip and/or strike with MCI data and other multiple logging measurements (for example, multi-arm caliper and directional measurements and imager/dipmeter) by performing a correction of the R1D and V1D inversion using a "Correct R1D and V1D inversion" module that is based, at least in part, on hybrid R1D-V1D inversion results. The hybridization makes use of the high vertical resolution obtained by R1D inversion in regions where R1D inversion is deemed to have high quality, and to switch to more accurate lower resolution V1D results to obtain more accurate solutions in regions where R1D inversion is considered low quality.

FIG. 7A generally depicts different aspects of a method in accordance with an embodiment of the present disclosure. First, at step 702 log data is obtained or received as an input. The log data may be one or more downhole measurements from an MCI tool or instrument (such as MCI tool 400). In one or more embodiments, the log data may be gathered or received from a number of different logging tools. Specifically, a logging tool to be used is directed downhole into the formation of interest, for example, formation 121. Once the logging tool reaches a desirable location or at specified intervals, it collects logging data relating to the formation of interest. The collected logging data may then be utilized in conjunction with the methods and systems disclosed herein as input log data. For instance, the MCI log data may be obtained using an MCI tool 400. The other logging tools used to gather multiple logging data may include, but are not limited to, multi-arm caliper, directional logging measurements, and imager/dipmeter. In certain embodiments, the log data may be calibrated, temperature corrected, be subject to other preprocessing, or any combination thereof.

Next, at step 704, any high-frequency noise of the log data may be removed. The high-frequency noise effects may be reduced using an adaptive low-pass filtering technique based on log-data uncertainty. At step 706, a bed-boundary determination is then performed based on high vertical-resolution MCI logs from step 702.

At step 708 the adaptive low-pass filter may be redesigned using the bed-boundary information and log-data uncertainty. The horn effects may accordingly be reduced using the redesigned adaptive low-pass filter and the log vertical resolution may be enhanced using the combined-signal and SWF processing. At step 710, one or more inputs are requested and received from the extended MCI BHC library. As discussed herein, ZZ is the element $\sigma_{zz}^{(i)}$ of conductivity tensor $\overline{\sigma_\alpha^{(i)}}$; and its processing library data consists of a group of data files which include the precalculated borehole response functions and software-focusing (SWF) filter factors.

At step 712, inversion results are obtained. For example, the R1D, V1D, and co-axial array induction (for example, the standard array compensated resistivity tool ("ACRt®") by Halliburton) inversion (using only z-z components of the log data) of the log data are determined to obtain one or more inversion results. In one or more embodiments, a hybrid R1D inversion is ran to determine one or more horizontal resistivity inversion results which are used to compute, $R_h^{R1D}$, $R_v^{R1D}$, $R_h^{V1D}$, $Dip^{R1D}$, and $Strike^{R1D}$, as illustrated in FIG. 7B at step 728. In one or more embodiments, a V1D inversion is ran to determine one or more vertical resistivity inversion results which are used to compute $R_h^{V1D}$, $R_v^{V1D}$, $Dip^{V1D}$, and $Strike^{V1D}$, as illustrated in FIG. 7B at step 730. In one or more embodiments, an inversion such as a standard ACRt® inversion is ran to compute $R_t$, as illustrated in FIG. 7B at step 732. Initial values of all unknown formation parameters, tool location and borehole size may be estimated. The initial estimates may be utilized in conjunction with the improved R1D multistep inversion of the log data to determine the actual values of the unknown formation parameters, tool location and/or borehole size. The MCI BHC library together with the robust borehole correction processing may supply BHC corrected log data for V1D processing to produce V1D inverted results with certain accuracy. These V1D results may then be used to provide reasonable mean values (or expected values) if the inverted formation parameters are within certain subgroups or subsections of the measured depth along a log profile due to the layer by layer inversion feature of the V1D processing.

At step 714 MCI borehole effects and final BHC-corrected results may be computed. Based on the ZZ BHC-corrected logs, regular MCI (ZZ) data processing may be conducted at step 716. The regular MCI(ZZ) processing may also entail skin effect correction ("SEC"), ZZ SWF and R1D inversion. At step 718 the R1D inversion and the V1D inversion may be combined to form the final vertical resistivity inversion result and the final horizontal resistivity inversion result; for example, based on the calculated dip variance within a selected window from the R1D inversion, the R1D inverted results may be selected as the final products if the dip variance is larger than a preselected threshold. Otherwise, the V1D inversion may be selected to refine the R1D inverted results.

At step 720, the combined inversion from step 718 is corrected. In particular embodiments, certain variables may be defined for the correction process. $N_{msp}$ denotes the total number of measured sampling points (MSP) along the log profile, for example the log generated at step 1002. $R_h^{V1D}$(MD, f, $A_n$), $R_v^{V1D} R_h^{V1D}$(MD, f, $A_n$), $Dip^{V1D}$(MD, f, $A_n$) and $Strike^{V1D}$(MD, f $A_n$) denote V1D inverted $R_h$, V1D inverted $R_v$, V1D inverted dip angle (dip angle from the vertical inversion), and V1D inverted strike (dip azimuth angle from the vertical inversion) at measured depth MD, operating frequency f, and subarray $A_n$, respectively. $R_h^{R1D}$(MD, f, $A_n$), $R_v^{R1D}$(MD, F, $A_n$)$R_v^{V1D}$(MD, f, $A_n$), $Dip^{R1D}$(MD, f, $A_n$), and $Strike^{R1D}$(MD, f, $A_n$) denote R1D inverted $R_h$, R1D inverted $R_v$, R1D inverted dip angle (dip angle from the radial inversion), and R1D inverted strike (dip azimuth angle from the radial inversion) at measured depth MD, operating frequency f, subarray $A_n$, respectively. At a given operating frequency f, the corrected R1D and V1D inversion may be determined at step 720 by first dividing the whole range of measured depth data into M subgroups (or subsections), for example, $G_k$(MD) where k=1, 2, ..., M and where each $G_k$(MD) has $P_k$ (or measured depth (or measured sampling points), so that $N_{MSP} = \Sigma_{k=1}^{M} P_k$. Next, the mean value of the V1D inverted formation parameters at each frequency f within each subsection of measured depth $G_k$(MD) for k=1, 2, ..., M is calculated:

[Equation 2]

$$\begin{cases} MVR_h^{V1D}(k, f) = \sum_{n=1}^{N} \frac{1}{N} \sum_{MD \in G_k(MD)} \frac{1}{P_k} R_h^{V1D}(MD, f, A_n) \\ MVR_v^{V1D}(k, f) = \sum_{n=1}^{N} \frac{1}{N} \sum_{MD \in G_k(MD)} \frac{1}{P_k} R_v^{V1D}(MD, f, A_n) \\ MVDip^{V1D}(k, f) = \sum_{n=1}^{N} \frac{1}{N} \sum_{MD \in G_k(MD)} \frac{1}{P_k} Dip^{V1D}(MD, f, A_n) \\ MVStrike^{V1D}(k, f) = \sum_{n=1}^{N} \frac{1}{N} \sum_{MD \in G_k(MD)} \frac{1}{P_k} Strike^{V1D}(MD, f, A_n) \end{cases}$$

Next, the mean value of the R1D inverted formation parameters within each subsection of measured depth $G_k$(MD) for k=1, 2, ..., M is calculated:

$$\begin{cases} MVR_h^{R1D}(k,f) = \sum_{n=1}^{N} \frac{1}{N} \sum_{MD \in G_k(MD)} \frac{1}{p_k} R_h^{R1D}(MD, f, A_n) \\ MVR_v^{R1D}(k,f) = \sum_{n=1}^{N} \frac{1}{N} \sum_{MD \in G_k(MD)} \frac{1}{p_k} R_v^{R1D}(MD, f, A_n) \\ MVDip^{R1D}(k,f) = \sum_{n=1}^{N} \frac{1}{N} \sum_{MD \in G_k(MD)} \frac{1}{p_k} Dip^{R1D}(MD, f, A_n) \\ MVStrike^{R1D}(k,f) = \sum_{n=1}^{N} \frac{1}{N} \sum_{MD \in G_k(MD)} \frac{1}{p_k} Strike^{R1D}(MD, f, A_n) \end{cases}$$

[Equation 3]

Next the relative factor of the mean values of the V1D and R1D inverted formation parameters within each subsection of measured depth $G_k(MD)$ for k=1, 2, ..., M is calculated:

$$\begin{cases} RFMVR_h(k,f) = \frac{MVR_h^{V1D}(k,f) - MVR_h^{V1D}(f)}{MVR_h^{R1D}(k,f) - MVR_h^{V1D}(f)} \\ RFMVR_v(k,f) = \frac{MVR_v^{V1D}(k,f) - MVR_v^{V1D}(f)}{MVR_v^{R1D}(k,f) - MVR_v^{V1D}(f)} \\ RFMVDip(k,f) = \frac{MVDip^{V1D}(k,f) - MVDip^{V1D}(f)}{MVDip^{R1D}(k,f) - MVDip^{V1D}(f)} \\ RFMVStrike(k,f) = \frac{MVSStrike^{V1D}(k,f) - MVStrike^{V1D}(f)}{MVStrike^{R1D}(k,f) - MVStrike^{V1D}(f)} \end{cases}$$

[Equation 4]

where, $$\begin{cases} MVR_h^{V1D}(f) = \min_{1 \le k \le m}(MVR_h^{V1D}(k,f)) \\ MVR_v^{V1D}(f) = \min_{1 \le k \le m}(MVR_v^{V1D}(k,f)) \\ MVDip^{V1D}(f) = \min_{1 \le k \le m}(MVDip^{V1D}(k,f)) \\ MVStrike^{V1D}(f) = \min_{1 \le k \le m}(MVStrike^{V1D}(k,f)) \end{cases}$$

[Equation 5]

Next, at each measured depth MD E $G_k(MD)$, k=1, 2, ..., M and each subarray An, the R1D inverted formation parameters are corrected utilizing the calculated difference of the mean values from Equation 5:

$$\begin{cases} R_h^{R1D}(MD, f, A_n) = MVR_h^{V1D}(f) + \\ \quad (R_h^{R1D}(MD, f, A_n) - MVR_h^{V1D}(f)) \times RFMVR_h(k,f) \\ R_v^{R1D}(MD, f, A_n) = MVR_v^{V1D}(f) + \\ \quad (R_v^{R1D}(MD, f, A_n) - MVR_v^{V1D}(f)) \times RFMVR_v(k,f) \\ Dip^{R1D}(MD, f, A_n) = MVDip^{V1D}(f) + \\ \quad (Dip^{R1D}(MD, f, A_n) - MVDip^{V1D}(f)) \times RFMVDip(k,f) \\ Strike^{R1D}(MD, f, A_n) = MVStrike^{V1D}(f) + \\ \quad (Strike^{R1D}(MD, f, A_n) - MVStrike^{V1D}(f)) \times RFMVStrike(k,f) \end{cases}$$

[Equation 6]

The accuracy of the corrected R1D and V1D combined inversion in Equation 6 should be improved from that of step 718 for producing combined and corrected logs for the visual interpretation at step 722.

In one or more embodiments, an improved or enhanced corrected R1D and V1D combined inversion is utilized to obtain a hybrid strike that is weighted based, at least in part, on one or more quality indicators. As part of the inversion, one or more combining weights for combining $R_h^{R1D}$ and $R_h^{V1D}$ are determined. In one or more embodiments, the combining weights are applied linearly. The combining weights are assigned values, for example, 0 to 1, at each depth point based on one or more quality indicators pertaining to the inversion results. In one or more embodiments, the weights are determined based, at least in part, on a comparison of a ratio of the final horizontal resistivity inversion results and the final vertical resistivity inversion result or the final dip angle result to a threshold. For example, one quality indicator of an MD inversion is the relationship between $R_h^{R1D}$ and $R_t$ from ACRt processing where $R_t$ is a non-azimuthal inversion result from a non-azimuthal inversion. $R_h^{R1D}$ is generally less than or equal to $R_t$ for R1D results to be acceptable. In operations where this condition is violated, MD results are rejected and replaced with V1D results. As illustrated in FIG. 7B at step 734, in one or more embodiments combining weights are calculated. The combining weights may be calculated as:

$$W_{Rvh} = \begin{cases} 0, & R_h^{R1D} \le R_t \\ 1, & R_h^{R1D} > R_t \end{cases} \quad W_{Rvh} \begin{cases} 0, & R_h^{R1D} \le R_t \\ 1, & R_h^{R1D} > R_t \end{cases}$$

[Equation 7]

The hybrid $R_h$ and $R_v$ (or final radial inversion result and final vertical inversion result, respectively) may then be computed, as illustrated in FIG. 7B at steps 736 and 738, as follows:

$$R_h^{hybrid} = (1 - W_{Rvh}) \times R_h^{R1D} + W_{Rvh} \times R_h^{V1D}$$ [Equation 8a]

$$R_v^{hybrid} = (1 - W_{Rvh}) \times R_v^{R1D} + W_{Rvh} \times R_v^{V1D}$$ [Equation 8b]

Next, a combining weight for the dip (or dip angle weight) is computed based on $R_h^{hybrid}$ and $R_v^{hybrid}$. At depths where the ratio $R_v^{hybrid}/R_h^{hybrid}$ is sufficiently larger than 1 (for example, 2 or more), the dip computed from R1D inversion is considered accurate and is preferred over that computed from V1D inversion because R1D has higher vertical resolution. Therefore, the combining weight for dip (or dip angle weight), as illustrated in FIG. 7B at step 740, may be computed as:

$$W_{Dip} = \begin{cases} 0, & R_v^{hybrid}/R_h^{hybrid} \gg 1 \\ 1, & R_v^{hybrid}/R_h^{hybrid} \approx 1 \end{cases}$$

[Equation 9]

The hybrid dip angle (or final dip angle) may then be computed using the dip angle weight, the dip angle from the radial inversion, and the dip angle from the vertical inversion, as illustrated in FIG. 7B at step 742, as:

$$Dip^{hybrid} = (1 - W_{Dip}) \times Dip^{R1D} + W_{Dip} \times Dip^{V1D}$$ [Equation 10]

Finally, a combining weight for the strike (or dip azimuthal angle weight) is computed based on $Dip^{hybrid}$. At depths where $Dip^{hybrid}$ is significant (for example, 10° or more), the strike computed from R1D inversion is considered accurate and is preferred over that computed from V1D inversion because R1D has higher vertical resolution. Otherwise, the strike of V1D inversion is used as it is more stable. The combining weight for strike (dip azimuth angle weight), as illustrated in FIG. 7B at step 744, may therefore be computed as:

$$W_{Strike} = \begin{cases} 0, & Dip^{hybrid} >> 0 \\ 1, & Dip^{hybrid}, \text{ or } W_{Dip} = 1 \end{cases} \quad \text{[Equation 11]}$$

And the hybrid strike (Strike$^{hybrid}$) (or final dip azimuth angle) based, at least in part, on the one or more weights, the one or more horizontal resistivity inversion results, and the one or more vertical resistivity inversion results may be computed, as illustrated in FIG. 7B at step 746, as:

$$\text{Strike}^{hybrid} = (1 - W_{Strike}) \times \text{Strike}^{R1D} + W_{Strike} \times \text{Strike}^{V1D} \quad \text{[Equation 12]}$$

Another quality indicator that may also be used to compute the combining weights is the inversion misfit of R1D and V1D inversions. At any given depth, more weight is assigned to the solution with lower misfit. Also, for any combining weight a smoothening filter may be applied to ensure smooth transitions between R1D and V1D in the hybrid response. FIG. 9 illustrates an example for hybrid R1D-V1D processing to measured log data. The "R1D" and "V1D" labeled panels illustrate R1D and V1D inversion results, respectively. The $R_v$ and $R_h$ are switched to V1D in regions where $R_h^{R1D} > R_v$. The dip is switched to V1D in regions where $R_v^{hybrid}/R_h^{hybrid} \approx 1$. The strike is switched to V1D in regions where Dip$^{hybrid} \approx 0$, or $W_{Dip} = 1$. The hybrid logs are seen to be more accurate than R1D logs and have higher vertical resolution than V1D logs.

At step 722 combined logs may be generated, reported, produced or any combination thereof. For example, in one embodiment the combined logs may be reported to another application or to a user interface for visual interpretation for any one or more determined formation parameters or for any other information measured, computed or determined. For example, the combined and corrected logs may be sent to a display of an information handling system located at the surface, such as at logging facility 144, downhole or any other information handling system at any location. Specifically, MCI combined logs, dual frequency logs, and/or differential/derivative logs, as well as other desired logs may be computed based on the BHC-corrected logs if necessary for visual log data interpretation. In one or more embodiments, one or more formation parameters may be determined based, at least in part, on a final result obtained from any one or more of the hybrid determinations as illustrated in Equations 7 through 12. The true formation parameters may be determined along with any other log data may be produced as part of the combined and corrected logs. All processed logs may then be delivered as a system output at step 724 for other applications. For instance, in certain embodiments, the $R_h$ and $R_v$ values may be used to compute the sandstone resistivity, which may in turn be used to determine the formation's oil-bearing saturation. At step 726, one or more drilling parameters may be adjusted based, at least in part, on the combined and correct logs of steps 722 and 724.

An improved inversion procedure in accordance with an embodiment of the present disclosure may be used to extract unknown model parameters from log data in the exemplary improved data processing system of FIG. 4A. Generally, the strike is first determined and used to solve for formation parameters (for example, horizontal resistivity ($R_h$), vertical resistivity ($R_v$) and dip) in the strike system. Finally, the other remaining unknown parameters such as, for example, tool position and borehole size may be determined if they are otherwise not available.

In a TI formation without a borehole, the apparent conductivity tensor $\overline{\sigma_\alpha^{(t)}}$ is reduced into a sparse one due to its couplings XY=YX=YZ=ZY=0 when the strike is zero degrees. Therefore, the tensor rotation may be used to determine the strike. In deviated or vertical wells, $\overline{\sigma_\alpha^{(t)}}$ may be a full tensor, but the combined signals (XY+YX) and (YZ+ZY) may be very small for longer-spacing arrays at lower frequencies if the formation strike is zero degrees as shown in FIG. 7A. Accordingly these features of the formation and tensor rotation may be used to estimate the formation strike.

The ZZ, (XX+YY), (XX−YY), [3ZZ−(XX+YY)]/2, and (XZ+ZX) components of longer spacing arrays are only slightly affected by the tool position ($d_{ecc}$/ecc and $\varphi_e$) in OBM wells. As a result, the effect of tool position on these components ($d_{ecc}$ and $\varphi_e$) may be ignored without detracting from the results of the analysis. Therefore, at step 718 of FIG. 7A, the R1D inversion algorithm of multiple log data may be implemented.

In certain embodiments, the methods and systems disclosed herein may further improve data processing by expressing the inversion issues involved as different constrained optimization problems. In certain embodiments, an object-function comparison and/or a constrained Levenberg-Marquardt ("LM") method may be used for solving for all unknown parameters. In one embodiment, the object-function comparison method may be used to solve the lower-dimensional optimization problems (for example, less than or equal to 2). For higher-dimensional optimization problems (for example, higher than 2) the constrained LM method may be used. The Jacobian matrix of the LM method may be determined analytically by using the interpolated function created based on the prebuilt look-up table of MCI responses, which improves the computational accuracy of the Jacobian matrix compared to numerical finite-difference methods. Accordingly, the methods disclosed herein can further improve the speed and efficiency of the inversion and whole data processing.

One or more embodiments of the present disclosure may include an information handling system with at least a processor and a memory device coupled to the processor that contains a set of instructions that when executed cause the processor to perform certain actions. In any embodiment, the information handling system may include a non-transitory computer readable medium that stores one or more instructions where the one or more instructions when executed cause the processor to perform certain actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

FIG. 8 is a diagram illustrating an example information handling system 800, according to aspects of the present disclosure. A processor or CPU 801 of the information handling system 800 is communicatively coupled to a memory controller hub or north bridge 802. Memory controller hub 802 may include a memory controller for directing information to or from various system memory components within the information handling system 800, such as RAM 803, storage element 806, and hard drive 807. The memory controller hub 802 may be coupled to RAM 803 and a graphics processing unit 804. Memory controller huh 802 may also be coupled to an I/O controller hub or south bridge 805. I/O hub 805 is coupled to storage elements of the information handling system 800, including a storage element 806, which may comprise a flash ROM that includes a basic input/output system (BIOS) of the computer system. I/O hub 805 is also coupled to the hard drive 807 of the information handling system 800. I/O hub 805 may also be coupled to a Super I/O chip 808, which is itself coupled to several of the I/O ports of the computer system, including keyboard 809 and mouse 810.

In certain embodiments, the methods disclosed herein may be performed using an information handling system. Specifically, the information handling system may include computer-readable media. The computer-readable media may contain machine-readable instructions that direct the information handling system to perform the methods disclosed herein. Additionally, the information handling system may include a user interface to permit a user to analyze, monitor and manipulate the results obtained using the methods disclosed herein and may further provide a visual interpretation of the obtained results.

Accordingly, the present disclosure provides an improved method for processing data to determine formation properties such as, for example, horizontal resistivity, vertical resistivity, dip and strike of the formation. The improved methods provide results in a fast and efficient manner and improve the accuracy of the obtained results by using MCI measurements combined with other multiple logging data (for example, multi-arm caliper and directional measurements, imager/dipmeter). Additionally, the improved methods and systems deliver more accurate conventional ZZ resistivity logs based on an improved BHC model that includes dip and resistivity anisotropy. Moreover, the improved methods disclosed herein reduce horn effects and enhance vertical resolution based on combined MCI signals, an adaptive low-pass filtering technique and SWF processing.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. Consequently, the disclosure is intended to be limited only by the spirit and scope of the appended claims, giving full cognizance to equivalents in all respects. The terms in the claims have their plain, ordinary meaning unless otherwise explicitly and clearly defined by the patentee.

In one or more embodiments, a logging method comprises receiving one or more downhole measurements from a multi-component instrument conveyed along a borehole through a formation, applying a radial inversion on the one or more downhole measurements to obtain one or more radial inversion results, applying a vertical inversion on the one or more downhole measurements to obtain one or more vertical inversion results, determining one or more weights based, at least in part, on a quality indicator associated with each of the one or more radial inversion results and the one or more vertical inversion results, determining at least one formation parameter based, at least in part, on the one or more weights, the one or more radial inversion results and the one or more vertical inversion results, reporting a log of the at least one formation parameter, adjusting a drilling parameter based, at least in part, on the log. In one or more embodiments, the logging method further comprises applying non-azimuthal inversion on the one or more downhole measurements to obtain one or more non-azimuthal inversion results and wherein the determining the one or more weights is based, at least in part, on the one or more non-azimuthal inversion results. In one or more embodiments, the logging method further comprises determining a final horizontal resistivity inversion result based, at least in part, on the one or more weights, the one or more radial inversion results and the one or more vertical inversion results and wherein determining the at least one formation parameter is based, at least in part, on the final horizontal resistivity inversion result. In one or more embodiments, the logging method further comprises determining a final vertical resistivity inversion result based, at least in part, on the one or more weights, the one or more radial inversion results and the one or more vertical inversion results and wherein determining the at least one formation parameter is based, at least in part, on the final vertical resistivity inversion result. In one or more embodiments, the logging method further comprises determining a dip angle weight associated with a dip angle from the radial inversion and a dip angle from the vertical inversion based, at least in part, on the final vertical resistivity inversion result and the final horizontal resistivity inversion result, determining a final dip angle result based, at least in part, on the dip angle weight, the dip angle from the radial inversion, and the dip angle from the vertical inversion and wherein determining the at least one formation parameter is based, at least in part, on the final dip angle result. In one or more embodiments, the logging method further comprises determining a dip azimuth angle weight associated with a dip azimuth angle from the radial inversion and a dip azimuth angle from the vertical inversion based, at least in part, on the final dig angle result, determining a final dip azimuth angle result based, at least in part, on the dip azimuth angle from the radial inversion, the dip azimuth angle from the vertical inversion, and the dip azimuth angle weight and wherein determining the at least one formation parameter is based, at least in part, on the final dip azimuth angle result. In one or more embodiments, any of the one or more weights are applied linearly. In one or more embodiments, any of the one or more weights are based, at least on part, on a ratio of the one or more non-azimuthal inversion results and the final horizontal resistivity inversion result. In one or more embodiments, any of the one or more weights are based, at least in part, on a comparison of a ratio of the final horizontal resistivity inversion result and the final vertical resistivity inversion result to a threshold. In one or more embodiments, the one or more weights are based, at least in part, on a comparison of the final dip angle result to a threshold. In one or more embodiments, the logging method further comprises determining a first mean for the one or more radial inversion results based on a running average, determining a second mean for the one or more vertical inversion results based on a running average and wherein the determining the final inversion result is based, at least in part, on the first mean and the second mean.

In one or more embodiments, a logging system comprises a drillstring, a logging tool coupled to the drillstring and an information handling system communicably coupled to the logging tool, the information handling system comprises a processor and memory device coupled to the processor, the memory device containing a set of instruction that, when executed by the processor, cause the processor to receive one or more downhole measurements from a multi-component instrument conveyed along a borehole through a formation, apply a radial inversion on the one or more downhole measurements to obtain one or more radial inversion results, apply a vertical inversion on the one or more downhole measurements to obtain one or more vertical inversion results, determine one or more weights based, at least in part, on a quality indicator associated with each of the one or more radial inversion results and the one or more vertical inversion results, determine at least one formation parameter based, at least in part, on the one or more weights, the one or more radial inversion results and the one or more vertical inversion results, report a log of the at least one formation parameter and adjust a drilling parameter based, at least in part, on the log. In one or more embodiments, the set of instructions of the logging system further cause the processor to apply non-azimuthal inversion on the one or more downhole measurements to obtain one or more non-azimuthal inversion results and wherein the determining the one or more weights is based, at least in part, on the one or more non-azimuthal inversion results. In one or more embodiments, the set of instructions of the logging system further cause the processor to determine a final horizontal resistivity inversion result based, at least in part, on the one or more weights, the one or more radial inversion results and the one or more vertical inversion results and wherein determining the at least one formation parameter is based, at least in part, on the final horizontal resistivity inversion result. In one or more embodiments, the set of instructions of the logging system further cause the processor to determine a final vertical resistivity inversion result based, at least in part, on the one or more weights, the one or more radial inversion results and the one or more vertical inversion results and wherein determining the at least one formation parameter is based, at least in part, on the final vertical resistivity inversion result. In one or more embodiments, the set of instructions of the logging system further cause the processor to determine a dip angle weight associated with a dip angle from the radial inversion and a dip angle from the vertical inversion based, at least in part, on the final vertical resistivity inversion result and the final horizontal resistivity inversion result, determine a final dip angle result based, at least in part, on the dip angle weight, the dip angle from the radial inversion, and the dip angle from the vertical inversion and wherein determining the at least one formation parameter is based, at least in part, on the final dip angle result. In one or more embodiments, the set of instructions of the logging system further cause the processor to determine a dip azimuth angle weight associated with a dip azimuth angle from the radial inversion and a dip azimuth angle from the vertical inversion based, at least in part, on the final dig angle result, determine a final dip azimuth angle result based, at least in part, on the dip azimuth angle from the radial inversion, the dip azimuth angle from the vertical inversion, and the dip azimuth angle weight, wherein determining the at least one formation parameter is based, at least in part, on the final dip azimuth angle result. In one or more embodiments any of the one or more weights are applied linearly. In one or more embodiments, any of the one or more weights are based, at least on part, on a ratio of the one or more non-azimuthal inversion results and the final horizontal resistivity inversion result. In one or more embodiments, any of the one or more weights are based, at least in part, on a comparison of a ratio of the final horizontal resistivity inversion result and the final vertical resistivity inversion result to a threshold. In one or more embodiments, the one or more weights are based, at least in part, on a comparison of the final dip angle result to a threshold. In one or more embodiments, the set of instructions of the logging system further cause the processor to determine a first mean for the one or more radial inversion results based on a running average, determine a second mean for the one or more vertical inversion results based on a running average and wherein the determining the at least one formation parameter is based, at least in part, on the first mean and the second mean.

In one or more embodiments, a non-transitory computer readable medium storing a program that, when executed, causes a processor to receive one or more downhole measurements from a multi-component instrument conveyed along a borehole through a formation, apply a radial inversion on the one or more downhole measurements to obtain one or more radial inversion results, apply a vertical inversion on the one or more downhole measurements to obtain one or more vertical inversion results, determine one or more weights based, at least in part, on a quality indicator associated with each of the one or more radial inversion results and the one or more vertical inversion results, determine at least one formation parameter based, at least in part, on the one or more weights, the one or more radial inversion results and the one or more vertical inversion results, report a log of the at least one formation parameter, adjust a drilling parameter based, at least in part, on the log. In one or more embodiments, the program of the non-transitory computer readable medium further causes the processor to apply non-azimuthal inversion on the one or more downhole measurements to obtain one or more non-azimuthal inversion results and wherein the determining the one or more weights is based, at least in part, on the one or more non-azimuthal inversion results. In one or more embodiments, the program of the non-transitory computer readable medium when executed further causes the processor to determine a final horizontal resistivity inversion result based, at least in part, on the one or more weights, the one or more radial inversion results and the one or more vertical inversion results and wherein determining the at least one formation parameter is based, at least in part, on the final horizontal resistivity inversion result. In one or more embodiments, the program of the non-transitory computer readable medium when executed further causes the processor to determine a final vertical resistivity inversion result based, at least in part, on the one or more weights, the one or more radial inversion results and the one or more vertical inversion results and wherein determining the at least one formation parameter is based, at least in part, on the final vertical resistivity inversion result. In one or more embodiments, the program of the non-transitory computer readable medium when executed further causes the processor to determine a dip angle weight associated with a dip angle from the radial inversion and a dip angle from the vertical inversion based, at least in part, on the final vertical resistivity inversion result and the final horizontal resistivity inversion result, determine a final dip angle result based, at least in part, on the dip angle weight, the dip angle from the radial inversion, and the dip angle from the vertical inversion and wherein determining the at least one formation parameter is based, at least in part, on the final dip angle result. In one or more embodiments, the program of the non-transitory computer readable medium when executed further causes the processor to determine a dip azimuth angle weight associated with a dip azimuth angle from the radial inversion and a dip azimuth angle from the vertical inversion based, at least in part, on the final dig angle result, determine a final dip azimuth angle result based, at least in part, on the dip azimuth angle from the radial inversion, the dip azimuth angle from the vertical inversion, and the dip azimuth angle weight and wherein determining the at least one formation parameter is based, at least in part, on the final dip azimuth angle result. In one or more embodiments, any of the one or more weights are applied linearly. In one or more embodiments, any of the one or more weights are based, at least on part, on a ratio of the one or more non-azimuthal inversion results and the final horizontal resistivity inversion result. In one or more embodiments, any of the one or more weights are based, at least in part, on a comparison of a ratio of the final horizontal resistivity inversion result and the final vertical resistivity inversion result to a threshold. In one or more embodiments, the one or more weights are based, at least in part, on a comparison of the final dip angle result t to a threshold. In one or more embodiments, the program of the non-transitory computer readable medium when executed further causes the processor to determine a first mean for the one or more radial inversion results based on a running average, determine a second mean for the one or more vertical inversion results based on a running average, and wherein the determining the at least one formation parameter is based, at least in part, on a combination of the first mean and the second mean.

What is claimed is:

1. A logging method comprising:
   receiving one or more downhole measurements from a multi-component instrument conveyed along a borehole through a formation;
   applying a radial inversion on the one or more downhole measurements to obtain one or more radial inversion results;
   applying a vertical inversion on the one or more downhole measurements to obtain one or more vertical inversion results;
   determining one or more weights based, at least in part, on at least one quality indicator, wherein the at least one quality indicator is based on at least one of: a relationship between at least one of the one or more radial inversion results and the one or more vertical inversion results; and
   an inversion misfit of at least one of the one or more radial inversion results and at least one of the one or more vertical inversion results
   determining at least one formation parameter based, at least in part, on the one or more weights, the one or more radial inversion results and the one or more vertical inversion results;
   reporting a log of the at least one formation parameter; and
   adjusting a drilling parameter based, at least in part, on the log.

2. The method of claim 1, further comprising:
   determining a final horizontal resistivity inversion result based, at least in part, on the one or more weights, the one or more radial inversion results and the one or more vertical inversion results; and
   wherein determining the at least one formation parameter is based, at least in part, on the final horizontal resistivity inversion result.

3. The method of claim 2, further comprising:
   determining a final vertical resistivity inversion result based, at least in part, on the one or more weights, the one or more radial inversion results and the one or more vertical inversion results; and
   wherein determining the at least one formation parameter is based, at least in part, on the final vertical resistivity inversion result.

4. The method of claim 3, further comprising:
   determining a dip angle weight associated with a dip angle from the radial inversion and a dip angle from the vertical inversion based, at least in part, on the final vertical resistivity inversion result and the final horizontal resistivity inversion result;
   determining a final dip angle result based, at least in part, on the dip angle weight, the dip angle from the radial inversion, and the dip angle from the vertical inversion; and
   wherein determining the at least one formation parameter is based, at least in part, on the final dip angle result.

5. The method of claim 4, further comprising:
   determining a dip azimuth angle weight associated with a dip azimuth angle from the radial inversion and a dip azimuth angle from the vertical inversion based, at least in part, on the final dig angle result;
   determining a final dip azimuth angle result based, at least in part, on the dip azimuth angle from the radial inversion, the dip azimuth angle from the vertical inversion, and the dip azimuth angle weight; and
   wherein determining the at least one formation parameter is based, at least in part, on the final dip azimuth angle result.

6. The method of claim 4, wherein the one or more weights are based, at least in part, on a comparison of the final dip angle result to a threshold.

7. The method of claim 3, wherein any of the one or more weights are based, at least in part, on a comparison of a ratio of the final horizontal resistivity inversion result and the final vertical resistivity inversion result to a threshold.

8. The method of claim 2, wherein any of the one or more weights are based, at least on part, on a ratio of the one or more non-azimuthal inversion results and the final horizontal resistivity inversion result.

9. The method of claim 1, wherein any of the one or more weights are applied linearly.

10. The method of claim 1, further comprising:
    determining a first mean for the one or more radial inversion results based on a running average;
    determining a second mean for the one or more vertical inversion results based on a running average; and
    wherein the determining the at least one formation parameter is based, at least in part, on the first mean and the second mean.

11. A logging system, comprising:
a drillstring;
a logging tool coupled to the drillstring; and
an information handling system communicably coupled to the logging tool, the information handling system comprises a processor and memory device coupled to the processor, the memory device containing a set of instruction that, when executed by the processor, cause the processor to:
receive one or more downhole measurements from a multi-component instrument conveyed along a borehole through a formation;
apply a radial inversion on the one or more downhole measurements to obtain one or more radial inversion results;
apply a vertical inversion on the one or more downhole measurements to obtain one or more vertical inversion results;
determine one or more weights based, at least in part, on at least one quality indicator, wherein the at least one quality indicator is based on at least one of:
a relationship between at least one of the one or more radial inversion results and the one or more vertical inversion results; and
an inversion misfit of at least one of the one or more radial inversion results and at least one of the one or more vertical inversion results
determine at least one formation parameter based, at least in part, on the one or more weights, the one or more radial inversion results and the one or more vertical inversion results;
report a log of the at least one formation parameter; and
adjust a drilling parameter based, at least in part, on the log.

12. The logging system of claim 11, wherein the set of instructions further cause the processor to:
determine a final horizontal resistivity inversion result based, at least in part, on the one or more weights, the one or more radial inversion results and the one or more vertical inversion results; and
wherein determining the at least one formation parameter is based, at least in part, on the final horizontal resistivity inversion result.

13. The logging system of claim 12, wherein the set of instructions further cause the processor to:
determine a final vertical resistivity inversion result based, at least in part, on the one or more weights, the one or more radial inversion results and the one or more vertical inversion results; and
wherein determining the at least one formation parameter is based, at least in part, on the final vertical resistivity inversion result.

14. The logging system of claim 13, wherein any of the one or more weights are based, at least in part, on a comparison of a ratio of the final horizontal resistivity inversion result and the final vertical resistivity inversion result to a threshold.

15. The logging system of claim 12, wherein any of the one or more weights are based, at least on part, on a ratio of the one or more non-azimuthal inversion results and the final horizontal resistivity inversion result.

16. The logging system of claim 11, wherein the set of instructions further cause the processor to:
determine a dip angle weight associated with a dip angle from the radial inversion and a dip angle from the vertical inversion based, at least in part, on the final vertical resistivity inversion result and the final horizontal resistivity inversion result;
determine a final dip angle result based, at least in part, on the dip angle weight, the dip angle from the radial inversion, and the dip angle from the vertical inversion; and
wherein determining the at least one formation parameter is based, at least in part, on the final dip angle result.

17. The logging system of claim 16, wherein the set of instructions further cause the processor to:
determine a dip azimuth angle weight associated with a dip azimuth angle from the radial inversion and a dip azimuth angle from the vertical inversion based, at least in part, on the final dig angle result;
determine a final dip azimuth angle result based, at least in part, on the dip azimuth angle from the radial inversion, the dip azimuth angle from the vertical inversion, and the dip azimuth angle weight; and
wherein determining the at least one formation parameter is based, at least in part, on the final dip azimuth angle result.

18. The logging system of claim 16, wherein the one or more weights are based, at least in part, on a comparison of the final dip angle result to a threshold.

19. The logging system of claim 11, wherein any of the one or more weights are applied linearly.

20. The logging system of claim 11, wherein the set of instructions further cause the processor to:
determine a first mean for the one or more radial inversion results based on a running average;
determine a second mean for the one or more vertical inversion results based on a running average; and
wherein the determining the at least one formation parameter is based, at least in part, on the first mean and the second mean.

21. A non-transitory computer readable medium storing a program that, when executed, causes a processor to:
receive one or more downhole measurements from a multi-component instrument conveyed along a borehole through a formation;
apply a radial inversion on the one or more downhole measurements to obtain one or more radial inversion results;
apply a vertical inversion on the one or more downhole measurements to obtain one or more vertical inversion results;
determine one or more weights based, at least in part, on at least one quality indicator, wherein the at least one quality indicator is based on at least one of:
a relationship between at least one of the one or more radial inversion results and the one or more vertical inversion results; and
an inversion misfit of at least one of the one or more radial inversion results and at least one of the one or more vertical inversion results
determine at least one formation parameter based, at least in part, on the one or more weights, the one or more radial inversion results and the one or more vertical inversion results;
report a log of the at least one formation parameter; and
adjust a drilling parameter based, at least in part, on the log.

22. The non-transitory computer readable medium of claim 21, wherein the program, when executed, causes the processor to:
determine a final horizontal resistivity inversion result based, at least in part, on the one or more weights, the one or more radial inversion results and the one or more vertical inversion results; and wherein determining the at least one formation parameter is based, at least in part, on the final horizontal resistivity inversion result.

23. The non-transitory computer readable medium of claim 22, wherein the program, when executed, causes the processor to:

determine a final vertical resistivity inversion result based, at least in part, on the one or more weights, the one or more radial inversion results and the one or more vertical inversion results; and wherein determining the at least one formation parameter is based, at least in part, on the final vertical resistivity inversion result.

24. The non-transitory computer readable medium of claim 23, wherein the program, when executed, causes the processor to:

determine a dip angle weight associated with a dip angle from the radial inversion and a dip angle from the vertical inversion based, at least in part, on the final vertical resistivity inversion result and the final horizontal resistivity inversion result;

determine a final dip angle result based, at least in part, on the dip angle weight, the dip angle from the radial inversion, and the dip angle from the vertical inversion; and wherein determining the at least one formation parameter is based, at least in part, on the final dip angle result.

25. The non-transitory computer readable medium of claim 24, wherein the program, when executed, causes the processor to:

determine a dip azimuth angle weight associated with a dip azimuth angle from the radial inversion and a dip azimuth angle from the vertical inversion based, at least in part, on the final dig angle result;

determine a final dip azimuth angle result based, at least in part, on the dip azimuth angle from the radial inversion, the dip azimuth angle from the vertical inversion, and the dip azimuth angle weight; and wherein determining the at least one formation parameter is based, at least in part, on the final dip azimuth angle result.

26. The non-transitory computer readable medium of claim 24, wherein the one or more weights are based, at least in part, on a comparison of the final dip angle result t to a threshold.

27. The non-transitory computer readable medium of claim 23, wherein any of the one or more weights are based, at least in part, on a comparison of a ratio of the final horizontal resistivity inversion result and the final vertical resistivity inversion result to a threshold.

28. The non-transitory computer readable medium of claim 21, wherein any of the one or more weights are applied linearly.

29. The non-transitory computer readable medium of claim 21, wherein any of the one or more weights are based, at least on part, on a ratio of the one or more non-azimuthal inversion results and the final horizontal resistivity inversion result.

30. The non-transitory computer readable medium of claim 21, wherein the program, when executed, causes the processor to:

determine a first mean for the one or more radial inversion results based on a running average;

determine a second mean for the one or more vertical inversion results based on a running average; and wherein the determining the at least one formation parameter is based, at least in part, on a combination of the first mean and the second mean.

* * * * *